(12) United States Patent
Barnes

(10) Patent No.: US 9,377,148 B2
(45) Date of Patent: Jun. 28, 2016

(54) ELECTROFUSION FITTINGS AND METHODS

(71) Applicant: Pioneer Lining Technology Limited, Glasgow (GB)

(72) Inventor: Stephen Barnes, Glasgow (GB)

(73) Assignee: Pioneer Lining Technology Limited, Glasgow (GB)

( * ) Notice: Subject to any disclaimer, the term of this patent is extended or adjusted under 35 U.S.C. 154(b) by 0 days.

(21) Appl. No.: 14/384,683

(22) PCT Filed: Mar. 12, 2013

(86) PCT No.: PCT/GB2013/050606
§ 371 (c)(1),
(2) Date: Sep. 11, 2014

(87) PCT Pub. No.: WO2013/136062
PCT Pub. Date: Sep. 19, 2013

(65) Prior Publication Data
US 2015/0076809 A1    Mar. 19, 2015

(30) Foreign Application Priority Data

Mar. 12, 2012 (GB) .................................. 1204294.1
Mar. 12, 2012 (GB) .................................. 1204300.6
Oct. 5, 2012 (GB) .................................. 1217883.6

(51) Int. Cl.
*F16L 47/03*      (2006.01)
*F16L 58/18*      (2006.01)
(Continued)

(52) U.S. Cl.
CPC ............... *F16L 47/03* (2013.01); *B29C 65/022* (2013.01); *B29C 65/3432* (2013.01);
(Continued)

(58) Field of Classification Search
CPC ... F16L 47/03; F16L 13/0263; G01M 3/2853; B29C 65/3432; B29C 65/8246; B29C 65/3468; B29C 65/022; B29C 66/73921

USPC .................................................. 285/21.2, 93
See application file for complete search history.

(56) References Cited

U.S. PATENT DOCUMENTS 2,241,526 A * 5/1941 Rosenkranz .......... G01M 3/022
                                                                           138/90
3,141,685 A * 7/1964 Watts .................... F16L 17/063
                                                                           285/93

(Continued)

FOREIGN PATENT DOCUMENTS

DE            20213974 U1    11/2002
DE    202011101425 U1    8/2012
(Continued)

OTHER PUBLICATIONS

PCT/GB2013/050606 International Search Report and Written Opinion Date of Mailing: Jul. 24, 2013 Pioneer Lining Technology Limited.

(Continued)

*Primary Examiner* — David E Bochna
(74) *Attorney, Agent, or Firm* — Sunstone IP

(57) ABSTRACT

Improvements to electrofusion fittings that enable the integrity of a weld between an electrofusion fitting and a pipe lining (or stand-alone pipe) to be tested in the field, and corresponding methods of installation and testing. An electrofusion fitting for joining sections of lined pipe has heating elements configured to create at least one weld between the electrofusion fitting and a pipe lining, and a channel provides fluid access to a test region between the electrofusion fitting and the pipe lining to allow leak testing to be performed. The channel may be provided through the fitting itself, or alternatively through the pipe lining. Methods of fabricating or laying pipeline may incorporate use of the improved fitting whether using length-by-length construction methods or joining subsequent reel-laid or towed-in pipe lengths. A closed bevel welding approach, permitting high speed automatic pipeline welding processes to be employed, is described in which the closed bevel is drilled through to allow access there through for providing leak testing and/or electrical power to the heating elements.

46 Claims, 8 Drawing Sheets

(51) Int. Cl.
*F16L 13/02* (2006.01)
*B29C 65/34* (2006.01)
*B29C 65/82* (2006.01)
*B29C 65/00* (2006.01)
*B29C 65/02* (2006.01)
*B29D 23/00* (2006.01)
*G01M 3/02* (2006.01)
*G01M 3/28* (2006.01)

(52) U.S. Cl.
CPC ........ *B29C 65/3468* (2013.01); *B29C 65/8246* (2013.01); *B29C 66/1222* (2013.01); *B29C 66/1224* (2013.01); *B29C 66/1282* (2013.01); *B29C 66/12841* (2013.01); *B29C 66/232* (2013.01); *B29C 66/5221* (2013.01); *B29C 66/52291* (2013.01); *B29C 66/52293* (2013.01); *B29C 66/52296* (2013.01); *B29C 66/5346* (2013.01); *B29C 66/612* (2013.01); *B29C 66/72321* (2013.01); *B29C 66/73921* (2013.01); *B29D 23/003* (2013.01); *F16L 13/02* (2013.01); *F16L 13/0263* (2013.01); *F16L 58/181* (2013.01); *G01M 3/02* (2013.01); *G01M 3/2853* (2013.01); *B29C 66/1286* (2013.01); *B29C 66/12842* (2013.01); *B29C 66/14* (2013.01); *F16L 2201/30* (2013.01)

(56) References Cited

U.S. PATENT DOCUMENTS

| | | | | |
|---|---|---|---|---|
| 4,147,926 A * | 4/1979 | Stahli | ................... | B29C 65/342 285/93 |
| 4,153,280 A * | 5/1979 | Bunyan | ................... | F16L 13/11 285/93 |
| 4,153,656 A * | 5/1979 | Bunyan | ................... | B29C 65/342 285/294.4 |
| 4,221,405 A * | 9/1980 | Stonitsch | ............... | F16L 59/182 285/93 |
| 4,703,150 A * | 10/1987 | Kunnecke | ............ | B29C 65/342 219/535 |
| 4,727,242 A * | 2/1988 | Barfield | ................ | B29C 65/342 285/93 |
| 4,733,554 A * | 3/1988 | Lazes | ................... | G01M 3/2853 73/46 |
| 4,869,533 A * | 9/1989 | Lehmann | ............... | B29C 65/342 285/93 |
| 5,116,082 A | 5/1992 | Handa et al. | | |
| 5,224,738 A * | 7/1993 | Taga | ..................... | B29C 66/723 285/21.2 |
| 5,252,157 A * | 10/1993 | Inhofe, Jr. | ............. | B29C 33/505 285/21.2 |
| 6,237,640 B1 | 5/2001 | Vanderlee | | |
| 8,398,119 B2 | 3/2013 | Kenworthy | | |
| 2002/0121777 A1 | 9/2002 | Krout et al. | | |
| 2013/0133829 A1 | 5/2013 | Pinder | | |

FOREIGN PATENT DOCUMENTS

| | | |
|---|---|---|
| DE | 102011103855 A1 | 11/2012 |
| EP | 1396672 A1 | 3/2004 |
| GB | 2500285 B | 4/2014 |
| WO | 9512086 A1 | 5/1995 |
| WO | 03076840 A1 | 9/2003 |
| WO | 2012019283 A1 | 2/2012 |
| WO | 2012059624 A1 | 5/2012 |

OTHER PUBLICATIONS

PCT/GB2013/050606 International Preliminary Report on Patentability Date of Mailing: Mar. 7, 2014 Pioneer Lining Technology Limited.

* cited by examiner

ELECTROFUSION FITTINGS AND METHODS

CROSS-REFERENCE TO RELATED APPLICATIONS

This application is a National Stage Application of PCT/GB2013/050606, filed Mar. 12, 2013, which designates the United States and claims priority of GB patent application GB1204294.1, filed Mar. 12, 2012, the subject matter of which is incorporated herein by reference in its entirety.

The present invention relates to the field of electrofusion fittings such as employed to join sections of lined pipe. More specifically, the present invention concerns improvements to electrofusion fittings that enable the integrity of a weld between an electrofusion fitting and a pipe lining to be tested in the field, and corresponding methods of installation and testing.

BACKGROUND TO THE INVENTION

It is known that the life and performance of new and existing pipelines can be extended and optimised by lining lengths of metal pipe with polymer liners. For example, the Applicant's Swagelining® pipe lining service allows existing pipelines to be remediated and new pipelines to be provided with corrosion resistance by installing a polymer liner that remains in tight contact with the inside of a host pipe.

To join adjacent lined pipe lengths, it is known to provide an electrofusion fitting to connect the inner pipe linings prior to welding the metal pipe lengths together. The Applicant's earlier International Application Publication Number WO 20101041016, FIG. 1 of which is reproduced in part in FIG. 1 of the present application, discloses an electrofusion fitting 101 and a method of forming a pipe joint between two lined metal pipe lengths 103a,103b incorporating such a fitting 101. The electrofusion fitting 101 is a sleeve largely comprised of a thermoplastic material and includes heating coils 107a,107b disposed at either end of the fitting 101. In use, the lining 105a is stripped back and the electrofusion fitting 101 inserted into the end of metal pipe length 103a. The heating coils 107a are then provided with electrical power which causes the fitting 101 and the lining 105a in the vicinity of the coils to melt and fuse together. The process is repeated to fuse the fitting 101 to the lining 105b of the other metal pipe length 103b, after which the metal pipe lengths themselves 103a, 103b are welded together at 109.

While the effect is such that a very effective weld is formed between the fitting 101 and the pipe linings 107a,107b, there is to date no suitable way to test the integrity of the weld in the field. If the weld is incomplete it is possible that fluid from within the pipe lining could leak through the weld and come into contact with the metal pipe causing corrosion and potentially ultimate failure, which defeats the purpose of having the metal pipe lined in the first place.

Accordingly, it is an object of at least one aspect of the present invention to provide an electrofusion fitting that enables the integrity of such a weld to be tested in the field. Embodiments of aspects of the present invention are intended to realise this object and to obviate or mitigate one or more further disadvantages of existing electrofusion fittings.

Further aims and objects of the invention will become apparent from reading the following description.

SUMMARY OF THE INVENTION

According to a first aspect of the invention, there is provided an electrofusion fitting for joining sections of lined pipe, the electrofusion fitting comprising one or more heating elements disposed on a surface of the electrofusion fitting and configured to create, in use, at least one weld between the electrofusion fitting and a pipe lining, and a channel extending at least partially through the electrofusion fitting to provide fluid access to a test region between the electrofusion fitting and the pipe lining to leak test the at least one weld.

The above invention provides a non-destructive way of testing the integrity and/or effectiveness of the electrofusion weld between an electrofusion fitting and a pipe lining. By providing fluid access to a test region, a leak test (which may be a pressure test) can be performed in the field and/or as part of an integrated lining method or system.

Preferably, the one or more heating elements are configured to produce one or more circumferential or annular welds between the electrofusion fitting. Preferably, the test region is disposed between two circumferential or annular welds. Preferably, the test region is a substantially annular space between the electrofusion fitting and the pipe lining.

Preferably, the channel extends between an aperture in a surface of the electrofusion fitting and the test region.

Optionally, the aperture is longitudinally spaced from the test region and the channel extends substantially longitudinally through the electrofusion fitting. Preferably, the aperture is formed on an outer surface of the electrofusion fitting. Preferably, such an aperture is located so as to be proximal the end of a pipe into which the electrofusion is configured for insertion. Optionally, the aperture is configured to receive a conduit for the supply of leak test or pressure test fluid.

Optionally, the aperture is configured to receive a probe via a hole drilled through a dosed bevel between the lined pipe sections.

Alternatively, the aperture is radially proximal to the test region and the channel extends substantially radially through the electrofusion fitting. Preferably, the aperture is formed on an inner surface of the electrofusion fitting. Optionally, the aperture is configured to cooperate with a probe for the supply of leak test or pressure test fluid. Optionally, the aperture is configured to receive a sealing plug. Optionally, the aperture is located within a recess sized to receive the sealing plug. Alternatively, the aperture and/or channel can be filled with a filler material.

Optionally, the electrofusion fitting further comprises one or more electrical contacts disposed on an inner surface of the electrofusion fitting and connected to the one or more heating elements through the electrofusion fitting.

Alternatively, the electrofusion fitting further comprises one or more electrical contacts disposed on an outer surface of the electrofusion fitting and connected to the one or more heating elements, the one or more electrical contacts configured to receive a probe for the supply of electrical power to the heating elements via one or more holes drilled through a closed bevel between the lined pipe sections.

Optionally, the channel is at least partially drilled through the electrofusion fitting. Alternatively, or additionally, a suitable tube or pipe is inserted into the electrofusion fitting during manufacture by a casting or injection moulding process.

Preferably, the one or more heating elements comprises at least one pair of heating coils disposed towards an end of the electrofusion fitting. Preferably, the electrofusion fitting comprises at least two pairs of heating coils disposed at either end of the electrofusion fitting defining at least one test region at each end of the electrofusion fitting.

Preferably, the electrofusion fitting comprises at least two channels extending through the electrofusion fitting to provide fluid access to corresponding at least two test regions.

Preferably, both of two channels extending through the electrofusion fitting extend substantially longitudinally through the electrofusion fitting. Alternatively, both of two channels extending through the electrofusion fitting extend substantially radially through the electrofusion fitting. Further alternatively, one of the two channels extends substantially longitudinally through the electrofusion fitting and the other extends substantially radially through the electrofusion fitting.

Optionally, the at least one pair of heating coils comprises two longitudinally separated but electrically connected portions of a continuous coil. Alternatively, the at least one pair of heating coils comprises two electrically separate heating coils.

Preferably, the electrofusion fitting comprises a thermoplastic material. Most preferably, the electrofusion fitting comprises a cylindrical sleeve of thermoplastic material.

Preferably, the electrofusion fitting is configured for insertion into the end of a lined pipe section. Preferably, the electrofusion fitting is configured to be received in a recess in the end of the pipe lining. Preferably, the electrofusion fitting is configured to be received in a recess formed in an inner surface of the pipe lining. Alternatively, the electrofusion fitting is configured to be received in a recess formed in an outer surface of the pipe lining. Further alternatively, the electrofusion fitting is configured to abut the end of the pipe lining.

Accordingly, the heating elements are preferably arranged on an outer surface of the electrofusion fitting. Alternatively, the heating elements are arranged on an inner surface of the electrofusion fitting. Further alternatively, the heating elements are arranged on an abutting end of the electrofusion fitting.

Optionally, the electrofusion fitting is formed by an injection moulding process.

According to a second aspect of the invention there is provided a method of testing a weld between an electrofusion fitting and a pipe lining, comprising creating at least one weld between the electrofusion fitting and the pipe lining, and providing fluid through a channel in the electrofusion fitting to a test region between the electrofusion fitting and the pipe lining to leak test the at least one weld.

Most preferably, the method comprises creating two annular welds between the electrofusion fitting and the pipe lining, and providing fluid to a test region bounded by the annular welds.

Preferably, the method comprises creating a recess in the pipe lining to receive the electrofusion fitting. The recess may be created on an inner surface of the pipe lining, or on an outer surface of the pipe lining.

Preferably, the method comprises cooling the electrofusion fitting and the pipe lining after creating the at least one weld and prior to leak testing the at least one weld.

Optionally, the method comprises drilling one or more holes in a dosed bevel formed between corresponding lined pipe sections. Preferably, the method comprises providing fluid to the test region via the one or more holes. Alternatively, or additionally, the method comprises providing electrical power to one or more heating coils of the electrofusion fitting via the one or more holes to create the at least one weld. To this end, the electrofusion fitting may be provided with electrical contacts on an outer surface.

Embodiments of the second aspect of the invention may comprise features corresponding to the preferred or optional features of the first aspect of the invention or vice versa.

According to a third aspect of the invention there is provided a method of testing a weld between an electrofusion fitting and a pipe lining, comprising creating two spaced welds between the electrofusion fitting and the pipe lining, and performing a pressure test between the welds.

Embodiments of the third aspect of the invention may comprise features corresponding to the preferred or optional features of the first or second aspects of the invention or vice versa.

According to a fourth aspect of the invention there is provided a method of laying a pipeline, the method comprising creating at least one weld between a first lined pipe section and an electrofusion fitting and providing fluid through a channel in the electrofusion fitting to a test region between the electrofusion fitting and the pipe lining to leak test the at least one weld.

Optionally, the method comprises drilling one or more holes in a dosed bevel formed between successive lined pipe sections, and providing fluid to the test region via the one or more holes and/or providing electrical power to one or more heating coils of the electrofusion fitting via the one or more holes to create the at least one weld. The method may comprise the subsequent step of welding the lined pipe sections together, in which an optional root pass may be employed to fill the one or more holes prior to completing the weld.

Embodiments of the fourth aspect of the invention may comprise features corresponding to the preferred or optional features of the first, second or third aspects of the invention or vice versa.

According to a fifth aspect of the invention, there is provided an electrofusion fitting for joining sections of lined pipe, the electrofusion fitting comprising one or more heating elements disposed on a surface of the electrofusion fitting and configured to create, in use, at least one weld between the electrofusion fitting and a pipe lining and a test region for leak testing of the at least one weld, wherein the test region is located so as to cooperate with a channel extending at least partially through the pipe lining to provide fluid access to the test region for the leak test.

According to a sixth aspect of the invention there is provided a method of testing a weld between an electrofusion fitting and a pipe lining, comprising creating at least one weld between the electrofusion fitting and the pipe lining, and providing fluid through a channel in the pipe lining to a test region between the electrofusion fitting and the pipe lining to leak test the at least one weld.

In the fifth and/or sixth aspects, the channel may be located within the pipe lining, or along an inner or an outer surface of the pipe lining.

According to a seventh aspect of the invention there is provided a method of laying a pipeline, the method comprising creating at least one weld between a first lined pipe section and an electrofusion fitting and providing fluid through a channel in the pipe lining to a test region between the electrofusion fitting and the pipe lining to leak test the at least one weld.

In the fifth, sixth and/or seventh aspects, the channel in the pipe lining can be pre-formed in the lining. Alternatively, the channel can be drilled through the lining from an end face of the lining to a point coincident with the test region. An access hole may then be drilled, or the access hole may have been pre-drilled, to allow fluid communication between the test region and the end of the pipe lining.

Embodiments of the fifth, sixth and seventh aspects of the invention may comprise features corresponding to the preferred or optional features of the first, second, third or fourth aspects of the invention or vice versa.

According to an eighth aspect of the invention there is provided a pipe lining configured to receive an electrofusion fitting and comprising a channel extending at least partially through the pipe lining to provide fluid access to a test region of the electrofusion fitting for leak testing a weld to be formed there between.

According to a ninth aspect of the invention there is provided a pipe section comprising a pipe lining according to the eighth aspect.

Embodiments of the eighth and ninth aspects of the invention may comprise features corresponding to the preferred or optional features of the first to seventh aspects of the invention or vice versa.

According to a tenth aspect of the invention, there is provided an electrofusion fitting for joining sections of pipe, the electrofusion fitting comprising one or more heating elements disposed on a surface of the electrofusion fitting and configured to create, in use, at least one weld between the electrofusion fitting and the pipe, and a channel extending at least partially through the electrofusion fitting to provide fluid access to a test region between the electrofusion fitting and the pipe to leak test the at least one weld.

According to an eleventh aspect of the invention there is provided a method of testing a weld between an electrofusion fitting and a pipe, comprising creating at least one weld between the electrofusion fitting and the pipe, and providing fluid through a channel in the electrofusion fitting or through a channel in the pipe to a test region between the electrofusion fitting and the pipe to leak test the at least one weld.

According to a twelfth aspect of the invention there is provided a method of testing a weld between an electrofusion fitting and a pipe, comprising creating two spaced welds between the electrofusion fitting and the pipe, and performing a pressure test between the welds.

According to a thirteenth aspect of the invention there is provided a method of laying a pipeline, the method comprising creating at least one weld between a pipe and an electrofusion fitting and providing fluid through a channel in the electrofusion fitting or through a channel in the pipe to a test region between the electrofusion fitting and the pipe to leak test the at least one weld.

According to a fourteenth aspect of the invention, there is provided an electrofusion fitting for joining sections of pipe, the electrofusion fitting comprising one or more heating elements disposed on a surface of the electrofusion fitting and configured to create, in use, at least one weld between the electrofusion fitting and the pipe and a test region for leak testing of the at least one weld, wherein the test region is located so as to cooperate with a channel extending at least partially through the pipe to provide fluid access to the test region for the leak test.

According to a fifteenth aspect of the invention there is provided a pipe configured to receive an electrofusion fitting and comprising a channel extending at least partially through the pipe to provide fluid access to a test region of the electrofusion fitting for leak testing a weld to be formed there between.

The tenth to fifteenth aspects of the invention recognise the that utility of the first to ninth aspects in relation to metal pipes with thermoplastic linings (for example) may be equally be employed in the joining or fitting of stand-alone thermoplastic pipes. Embodiments of the tenth to fifteenth aspects of the invention may therefore comprise features corresponding to the preferred or optional features of the first to ninth aspects of the invention or vice versa.

According to a sixteenth aspect of the invention, there is provided a pipe comprising two lined pipe sections joined by an electrofusion fitting according to the first or the fifth aspect, or two pipe sections joined by an electrofusion fitting according to the tenth or the fourteenth aspect.

According to a seventeenth aspect of the invention, there is provided a pipe comprising two lined pipe sections, an electrofusion fitting and a weld tested according to the second, the third or the sixth aspect, or two pipe sections, an electrofusion fitting and a weld tested according to the eleventh or the twelfth aspect.

According to an eighteenth aspect of the invention, there is provided a pipeline laid according to the method of the fourth, the seventh or the thirteenth aspect.

According to a nineteenth aspect of the invention, there is provided a pipe comprising a plurality of pipe linings according to the eighth aspect or pipes according to the fifteenth aspect.

Embodiments of the sixteenth to nineteenth aspects of the invention may comprise features corresponding to the preferred or optional features of the first to fifteenth aspects of the invention or vice versa.

According to a twentieth aspect of the invention, there is provided a plug for closing a pipe or a lined pipe section, the plug comprising one or more heating elements disposed on a surface of the plug and configured to create, in use, at least one weld between the plug and a pipe or pipe lining, and a channel extending at least partially through the plug to provide fluid access to a test region between the plug and the pipe lining to leak test the at least one weld.

According to a twenty-first aspect of the invention, there is provided a plug for closing a pipe or a lined pipe section, the plug comprising one or more heating elements disposed on a surface of the plug and configured to create, in use, at least one weld between the plug and a pipe or pipe lining and a test region for leak testing of the at least one weld, wherein the test region is located so as to cooperate with a channel extending at least partially through the pipe or pipe lining to provide fluid access to the test region for the leak test.

Embodiments of the twentieth and twenty-first aspects of the invention may comprise features corresponding to the preferred or optional features of the first to fifteenth aspects of the invention or vice versa.

According to another aspect of the invention, there is provided an electrofusion fitting, pipe lining, pipe or method of testing a weld between an electrofusion fitting and a pipe lining or pipe, substantially as herein described with reference to the appended drawings.

BRIEF DESCRIPTION OF THE DRAWINGS

Aspects and advantages of the present invention will become apparent upon reading the following detailed description and upon reference to the following drawings (like reference numerals referring to like features) in which.

DETAILED DESCRIPTION OF PREFERRED EMBODIMENTS

Figure 1:
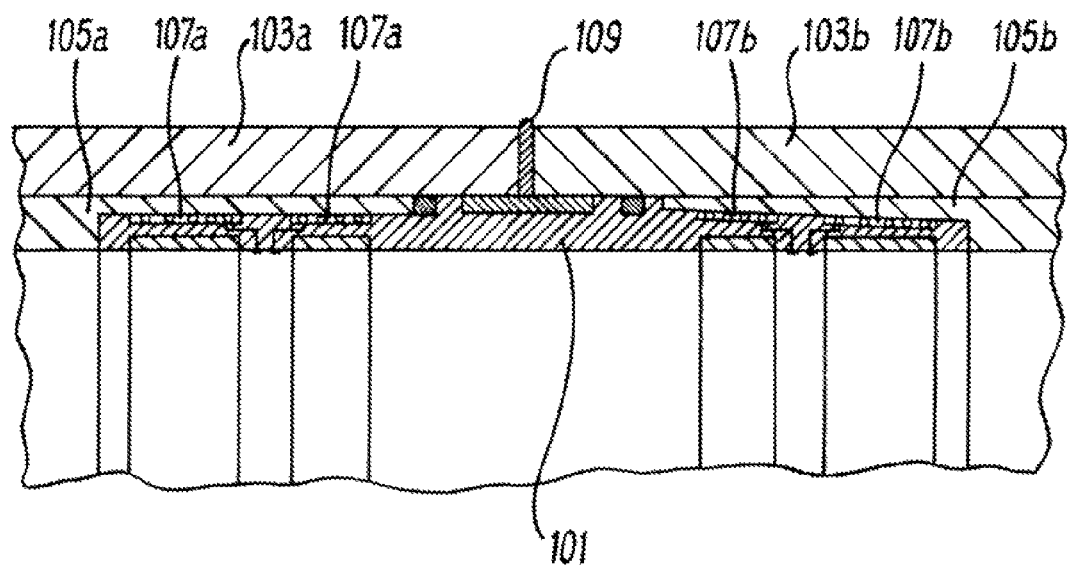
FIG. 1 is a partial reproduction of FIG. 1 of the Applicant's earlier International Application Publication Number WO 2010/041016, showing a schematic sectional view of an electrofusion fitting according to the prior art.
Figure 2:
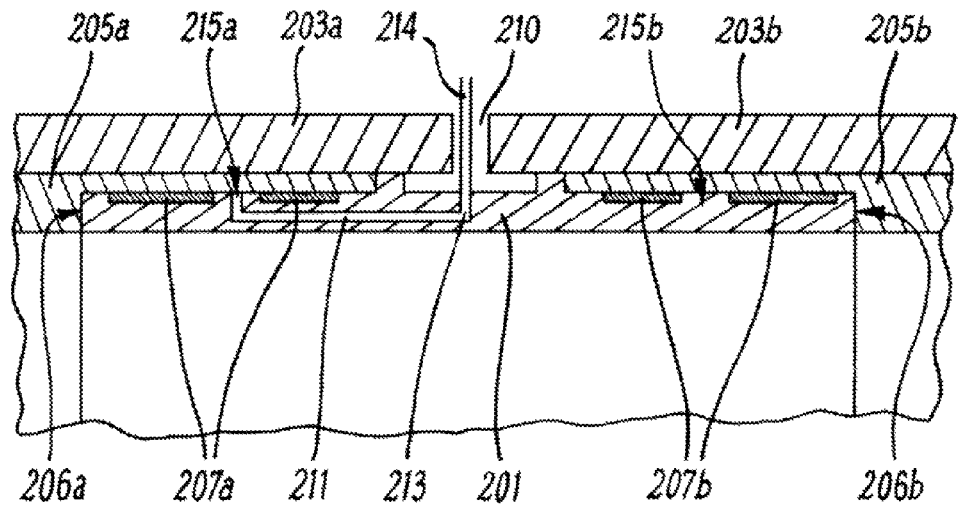
FIG. 2 is a schematic sectional view of an electrofusion fitting according to an embodiment of an aspect of the present invention.

As discussed in the background to the invention above, it is not presently possible to test the integrity of a weld formed between an electrofusion fitting and pipe linings in the field. An embodiment of the present invention is illustrated in FIG. 2 and overcomes this problem with the prior art.

An improved electrofusion fitting 201 is formed by a cylindrical sleeve of a thermoplastic material having pairs of heating coils 207a,207b disposed toward either end of the fitting 201. The electrofusion fitting 201 is shaped and sized to be inserted into the end of a lined pipe section 203a/203b and received in a recess 206a/206b in the end of the pipe lining 205a/205b. The heating coils 207a/207b are embedded in the outer surface of the fitting 201, so as to be adjacent to and facing an inner surface of the pipe lining 205a/205b, such that when provided with electrical power the thermoplastic material of the fitting 201 and of the lining 205a/205b in the vicinity of the coils melts and fuses together, thus creating circumferential or annular welds between the fitting 201 and the pipe lining 205a/205b.

The electrofusion fitting 201 is also provided with a channel 211 that extends from an aperture 213 towards the middle of the fitting 201 to a point between the heating coils 207a, thus providing a means of fluid communication between a point proximal the end of the pipe 203a and a test zone (or test region) 215a. Due to the nature of the welds (i.e. circumferential or annular) the test zone 215a comprises an annular, or substantially annular, space between the fitting 201 and the lining 205a. After the heating coils 207a have been activated to weld the fitting 201 to the lining 205a, the integrity of the weld can be subjected to a hydrostatic test whereby a set pressure (e.g. in the region of a few hundred millibars to a few bars) of air or an incompressible liquid such as water or oil is supplied to the test zone 215a and then monitored to determine if there is any pressure loss which would correspond to a leak in one or both of the welds. A conduit 214 allows the air (or water, oil, etc.) to be provided to the aperture 213 from an external supply.

Of course, the welds produced at either end of the electrofusion fitting can be tested simultaneously, in sequence, or piece-wise as each weld is created (i.e. the first weld created and tested, then the second weld created and tested).

Once it has been determined that both electrofusion welds have been performed satisfactorily, the pipe lengths themselves can be welded together at pipe weld region 210.

Note that while it is preferred to employ an incompressible liquid such as water or oil to test the integrity of the weld, it will be understood that any suitable fluid (liquid or gas) could be employed. Furthermore, while the test could be performed as a pressure test this may be viewed as excessive or overcautious due to the position of the weld and that it is not directly exposed to fluids carried by the pipes (in this embodiment at least). It is particularly advantageous that the integrity test can be carried out as a leak test rather than as a pressure test, because this reduces complexity and means that the test can be performed in situations where pressure tests might be unsuitable (e.g. where there are explosion or ignition risks).

Furthermore, while the electrofusion fitting has been described as comprising two heating coils, it will be understood that the coils could in fact be a single coil configured to provide two distinct weld zones (e.g. by forming discrete coil portions). It will also be understood that the weld zones could be created using different heating element types than heating coils, although this is a preferred arrangement. In other words, any arrangement that provides spaced welds between the electrofusion fitting and a pipe lining may be employed.

In this example, the channel 211 has been formed in an injection moulding process to manufacture the electrofusion fitting 201. However, it will be realised that a same or similar channel can be formed by drilling through the material of the electrofusion fitting. For example, two substantially radial blind holes can be created (e.g. by drilling or milling) in the outer surface of the electrofusion fitting—one proximal to the test region and one proximal to the middle of the fitting—and a longitudinal channel created (e.g. by drilling or milling) between them. Alternatively a suitably sized and shaped tube, microbore pipe or similar, can be placed into the electrofusion fitting when it is manufactured, e.g. as part of a casting process.

While the above-described electrofusion fitting 201 provides access to the test zone 215a from a position external to the pipeline, it is also envisaged that access to the test zone could be provided from a position internal to the pipeline. An alternative electrofusion fitting 301 is now described with reference to FIG. 3, which comprises a similar test zone 315a between heating coils 307a and a corresponding channel 311 that extends between the test zone 315a and an aperture 313 on an inner surface of the electrofusion fitting 301.

In this embodiment, fluid access to the test zone 315a is achieved either through the bore of the lined pipe section (e.g. by inserting a rod or probe (not shown) in the direction of arrow X) or from the opposite end through the bore of the electrofusion fitting (e.g. by inserting a rod or probe (not shown) in the direction of arrow Y).

In a similar manner to that described above, a leak test or pressure test is performed on the test zone 315a via fluid channel 315a. Assuming the applied pressure is maintained for a predetermined time period, the weld process can be repeated at the opposite end of the electrofusion fitting 301 for the next lined pipe section 303b, and thereafter the pipe sections 303a,303b welded together. Note that a recess 319 formed in the outer surface of the electrofusion fitting 301 may be provided with an insulating material or cladding to prevent damage to the electrofusion fitting 301 when the pipe sections 303a,303b are welded together.

Note that to prevent fluid being carried by the pipeline from entering the channel 311, the aperture 313 should be plugged or sealed after testing. This can be effected by inserting a solid plug, injecting an epoxy or other setting or hardening substance, or the like.

This embodiment of the electrofusion fitting 301 is particularly useful in situations where it is undesirable, impractical or impossible to accommodate a conduit (such as 214 in FIG. 2) to supply leak test or pressure test fluid to a channel leading to a test zone. This may be the case in narrow gap weld operations (such as typically used in s-lay pipe installation methods) where there is effectively no useable gap provided between adjacent pipe sections.

In the above described embodiments, fluid access is provided to corresponding test regions 215*b*,315*b* between coils 207*b*,307*b* at the opposite end of the electrofusion fittings 201,301 via same or similarly arranged channels (disposed in the opposite side of the electrofusion fitting and hence not shown, although these could equally be disposed on the same side or at any other location in the electrofusion fittings 201, 301).

Figure 3:
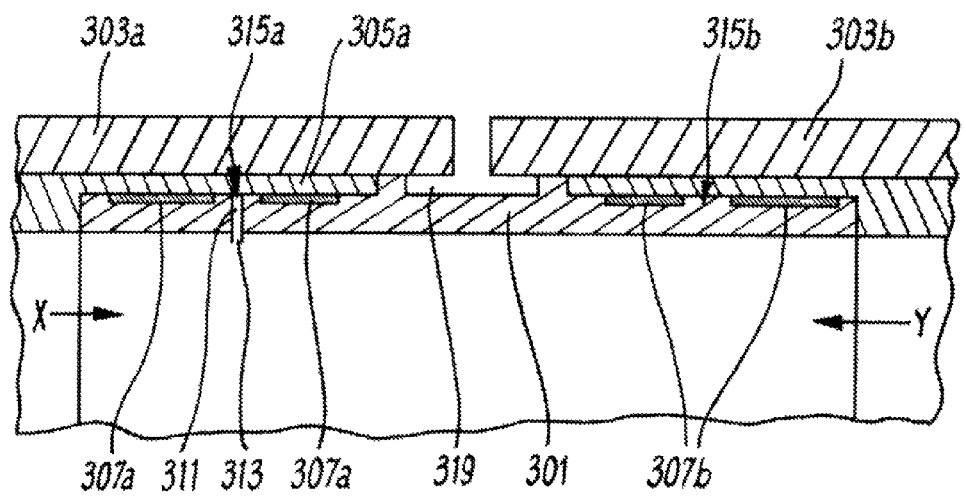
FIG. 3 is a schematic sectional view of an electrofusion fitting according to an alternative embodiment of an aspect of the present invention.
Figure 4:
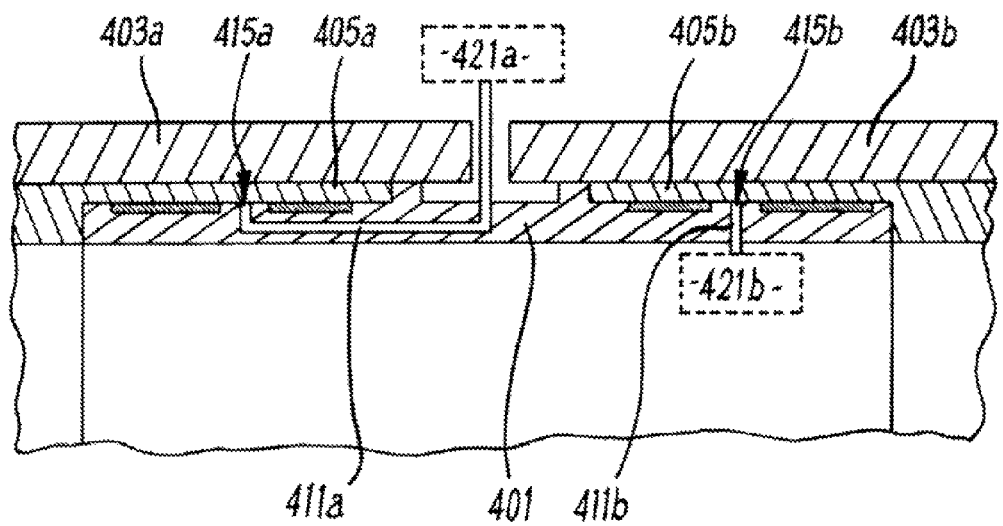
FIG. 4 is a schematic sectional view of an electrofusion fitting according to another alternative embodiment of an aspect of the present invention.

However, it is foreseen and illustrated in FIG. 4 that an electrofusion fitting 401 can be provided with a first channel 411*a* at one end of the electrofusion fitting 401 of a type similar to the channel 211 provided in electrofusion fitting 201 illustrated in FIG. 2, and a second channel 411*b* at the opposite end of the electrofusion fitting 401 of a type similar to the channel 311 provided in electrofusion fitting 301 illustrated in FIG. 3.

In such an embodiment, the electrofusion fitting 401 can be welded to the first pipe lining 405*a* and the test region 415*a* leak tested using leak testing apparatus 421*a* located externally to the pipeline. The electrofusion fitting can then be welded to the second pipe lining 405*b* and, for example in narrow gap welding methods where there is no useable gap between the pipe sections 403*a*,403*b*, the test region 415*b* leak tested using leak testing apparatus 421*b* located internally to the pipeline.

Figure 5:
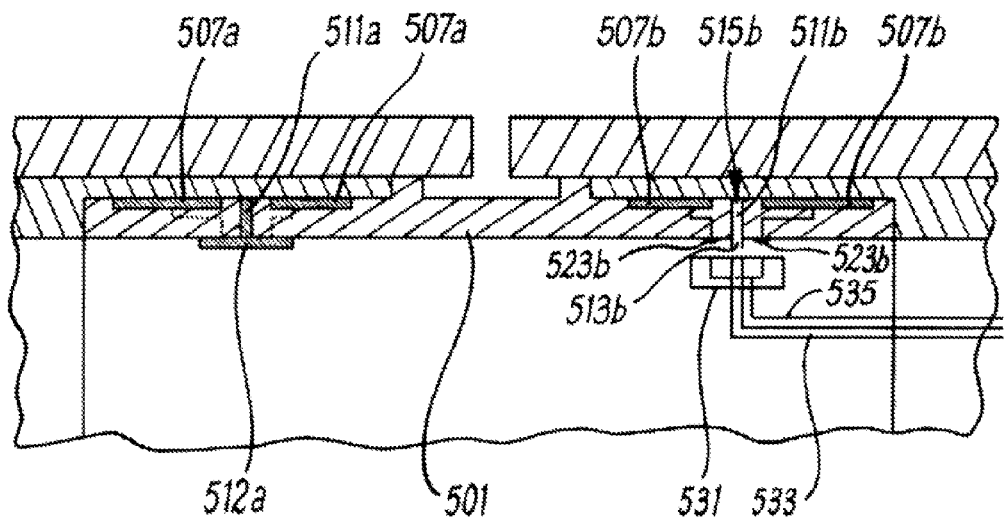
FIG. 5 is a schematic sectional view of an electrofusion fitting according to a further alternative embodiment of an aspect of the present invention.

FIG. 5 illustrates an electrofusion fitting 501 having channels 511*a*,511*b* at both ends of the electrofusion fitting 501 of a type similar to the channel 311 provided in electrofusion fitting 301 illustrated in FIG. 3. Also in this embodiment, electrical supply to the heating coils 507*a*,507*b* is provided via contacts disposed on an inner surface of the electrofusion fitting 501 (as indicated by reference numerals 523*b*). A probe 531 is located internally of the pipeline and carries a fluid supply line 533 and an electrical supply line 535 and engages with the aperture 513*b* and the contacts 523*b* on the inner surface of the electrofusion fitting 501.

Accordingly, electrical power can be provided from the electrical supply line 535 to the heating coils 507*a*,507*b* via contacts 523*b* to perform the weld step without having to route wires out of or through the pipeline. Subsequently, the weld can be tested for leaks via the fluid supply line 533 which is in fluid communication with test region 515*b* via aperture 513*b* and channel 511*b*. After the weld has been created and tested to ensure it is satisfactory, the probe 531 is removed and the channel sealed.

In this particular embodiment, channel 511*a* has been sealed by the insertion of a solid plug 512*a* which not only closes the channel but electrically isolates the contacts (not visible, accordingly). It is envisaged that the contacts and the aperture could be located within a recess and the plug shaped to fit the recess so as to maintain a constant inner diameter within the electrofusion fitting. However, the plug could instead be bevelled to provide a smooth and gradual change of cross section in this area to reduce or minimise turbulent effects.

The embodiments described above with reference to FIGS. 2 to 5 illustrate a preferred arrangement in which the heating elements (coils, in these examples) are disposed on an outer face of the electrofusion fitting so as to create a weld between that outer face and an inner face of the pipe lining. In each of the examples shown, a recess has been provided in the lining to receive the electrofusion fitting, and the electrofusion fitting has been shaped and sized so as to maintain a continuous inner diameter during the transition from lining to electrofusion fitting to lining again. Of course, it will be realised that there may be no recess, and the electrofusion fitting may simply have an outer diameter commensurate with an inner diameter of the pipe lining—with little or no consideration given to minimising turbulent effects within the pipeline.

Figure 6:
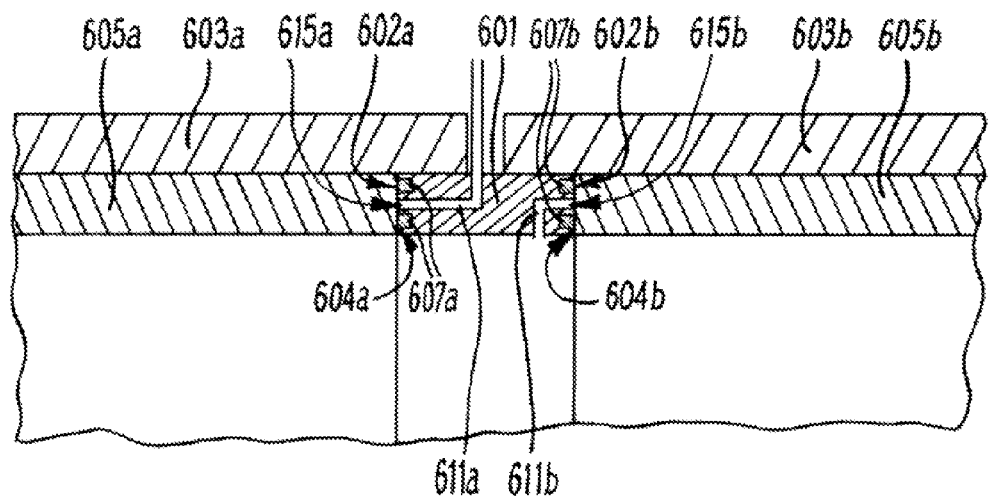
FIG. 6 is a schematic sectional view of an electrofusion fitting according to a yet further alternative embodiment of an aspect of the present invention.

However, FIG. 6 presents a further alternative embodiment in which heating coils 607*a*,607*b* are proved in the end faces 602*a*,602*b* of an electrofusion fitting 601 to engage directly with corresponding end faces 604*a*,604*b* of the pipe linings 605*a*,605*b*.

While the electrofusion fitting 601 has been illustrated as having a first channel 6118*a* at one end of the electrofusion fitting 601 of a type similar to channel 211 of the electrofusion fitting 201 illustrated in FIG. 2, and a second channel 611*b* at the opposite end of the electrofusion fitting 601 of a type similar to channel 311 of the electrofusion fitting 301 illustrated in FIG. 3, it will now be realised that two same channels of either kind, similar, or equivalent, may be employed.

In any case, the arrangement is such that after electrical power has been supplied to the heating coils 607*a*,607*b*, two welds are created which define test regions 615*a*,615*b* there between, and the channels 611*a*,611*b* as in previous embodiments provide a means for performing a leak test or pressure test in this region to determine the integrity and/or effectiveness of the welds.

Figure 7:
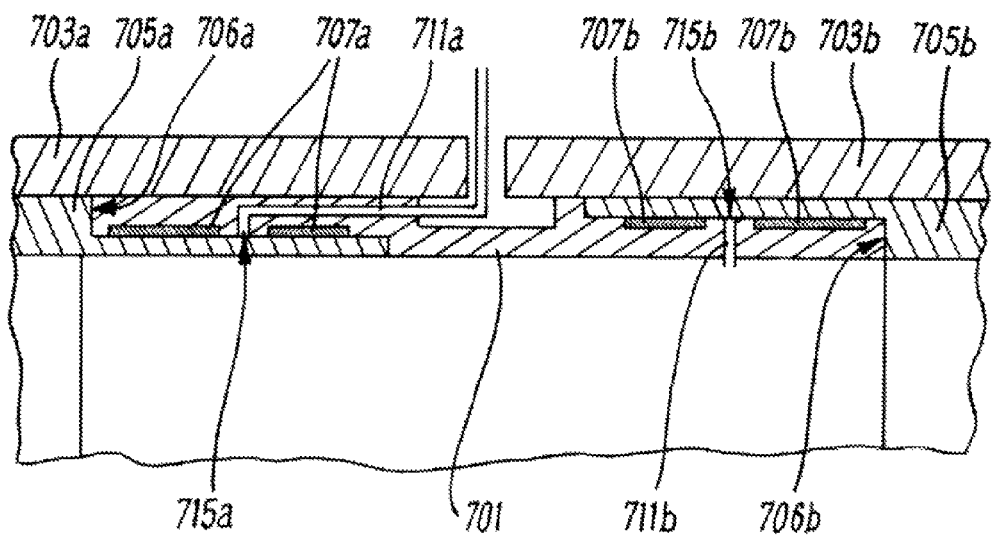
FIG. 7 is a schematic sectional view of an electrofusion fitting according to a fifth alternative embodiment of an aspect of the present invention.

In FIG. 7, an electrofusion fitting 701 bearing some similarities to the electrofusion fitting 401 illustrated in FIG. 4 is presented. Again, the electrofusion fitting 701 is provided with different channels 711*a*,711*b* at opposite ends of the electrofusion fitting 701 (of types similar to the channels 211,311 provided in electrofusion fittings 201,301 illustrated in FIGS. 2 and 3, respectively). However, in this embodiment it can be seen that rather than a recess (see for example 706*b*) being provided in the inner face of the pipe lining 705*a*, a recess 706*a* is provided in the outer face of the pipe lining 705*a* and the corresponding end of the electrofusion fitting has an outer diameter commensurate with an inner diameter of the pipe section 703*a*, and an inner diameter commensurate with an outer diameter of the recessed pipe lining 705*a*. The heating coils 707*a* are therefore disposed on an inner surface of the electrofusion fitting 701. However, the test region 705*a* is effectively in almost the same location as in previous embodiments.

Although FIG. 7 illustrates a non-symmetrical electrofusion fitting 701 with different interfaces, it will of course be realised that an electrofusion fitting could be configured to be symmetrical; i.e. where both ends of the electrofusion fitting have an outer diameter commensurate with an inner diameter of the pipe section, and an inner diameter commensurate with an outer diameter of a recessed pipe lining.

Each of the above described embodiments benefit from the Applicant's realisation that by creating discrete welds there are resulting un-welded zones there between that can be subjected to leak tests or pressure tests to test the integrity and/or effectiveness of the weld between the electrofusion fitting and the pipe lining; and exemplary electrofusion fittings have been described which incorporate and/or accommodate this functionality. However, the Applicant also realises that similar benefits may be obtained by modification of the pipe linings themselves.

Figure 8:
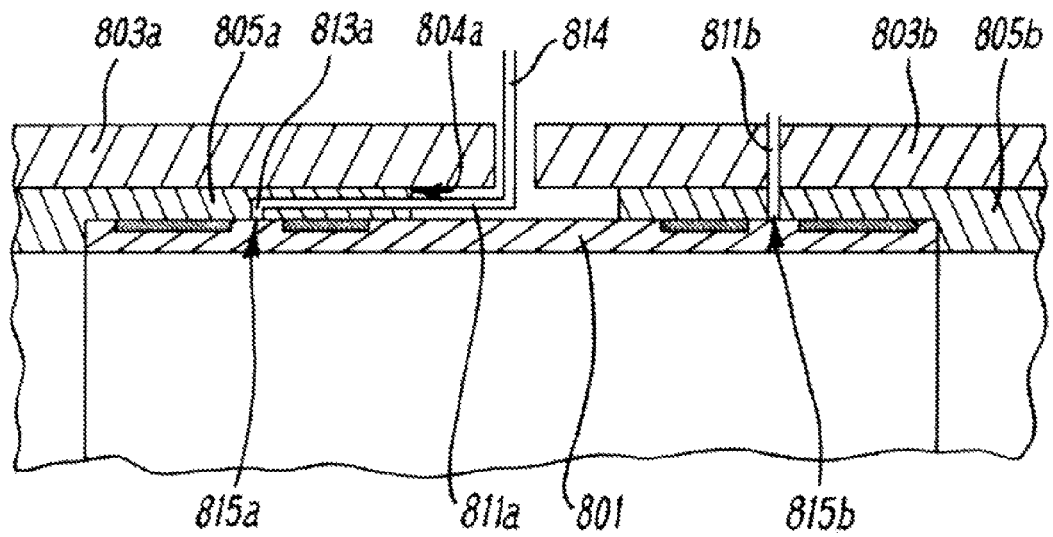
FIG. 8 is a schematic sectional view of a pipe lining according to an embodiment of an alternative aspect of the present invention.

FIG. 8 presents an alternative embodiment in which rather than a channel being provided through the electrofusion fitting 801 to the test region 815a, a channel 811a is instead provided through the pipe lining 805a to the test region 815a. Leak testing or pressure testing can be carried out in an analogous manner to that described in relation to embodiments in which the channel is provided through the electrofusion fitting itself.

This embodiment is particularly advantageous as it permits the benefits of the invention to be realised without requiring modifications to an electrofusion fitting other than to ensure discrete welds which define a test region therebetween. For example, a blind hole can be drilled in an inner surface of the pipe lining 805a to define an aperture 813a and a substantially perpendicular hole drilled between the end face 804a of the pipe lining 805a and the blind hole to create the fluid channel 811a. Subsequently, a conduit 814 (with an elbow, articulation, or other bend as appropriate) can be inserted into the channel 811 via the end face 804a to supply leak test or pressure test fluid to the test zone 815a.

The electrofusion fitting 801 can then be inserted, the weld step performed, and the integrity of the weld subsequently tested.

Alternatively, as illustrated at the opposite end of the arrangement shown in FIG. 8, a channel 811b can be drilled substantially radially through the pipe section 803b and the pipe lining 805b. This step can be performed before or after the electrofusion fitting 801 is in place; in either case, direct access is then provided to the test region 815b to allow leak testing or pressure testing to be performed post-welding.

Figure 9:
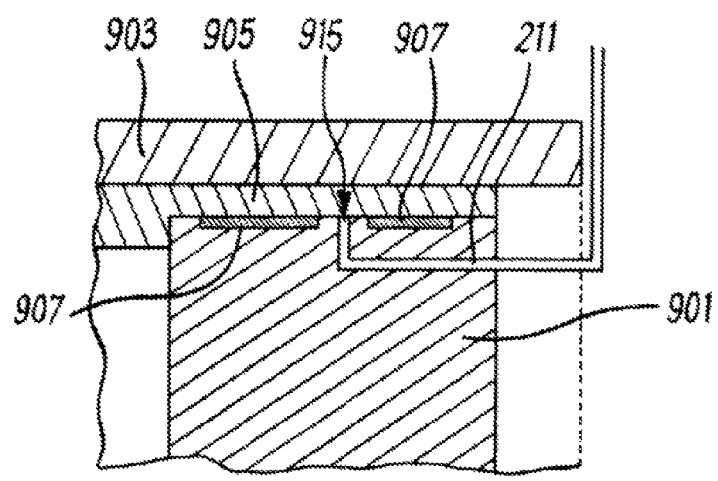
FIG. 9 is a schematic sectional view of a plug according to an embodiment of a further alternative aspect of the present invention.

It will of course be understood that while the present invention has been illustrated with reference to electrofusion fittings for joining lined pipe sections, such an electrofusion fitting can be employed to join standalone plastic pipes, or indeed to provide a plug or to blank off the end of a lined pipe section or standalone plastic pipe. FIG. 9 illustrates such a plug 901 that has been inserted into the end of a lined pipe 903 to provide a temporary or a permanent closure. As with the above described electrofusion fittings, the plug 901 is received in a recess in the pipe lining 905, and has heating coils 907 which, when supplied with electrical power, fuse the plug 901 to the lining 905. A test region 915 is provided between the distinct weld zones formed by the heating coils 907, and fluid access is via channel 211 which extends through an end face of the plug 901. It will be understood that, similar to channel 811b in FIG. 8, a channel could be drilled through the pipe 903 and lining 905 to provide fluid access to the test region 915.

Common techniques for laying pipe on the sea floor include s-lay pipeline installation and j-lay pipeline installation. In these methods, pipe is fed out from the stem of a pipe-laying vessel as it travels forward; s-lay refers to the "s" shape of the pipeline between the vessel and the seabed resulting from the substantially horizontal deployment direction, and j-lay refers to the "j" shape of the pipeline between the vessel and the seabed resulting from the substantially vertical deployment direction. In s-lay and j-lay operations, a pipeline can be constructed length-by-length in which case adjacent sections of pipe are welded on board (as contrasted with a reel-lay method in which case a continuous length of pipe is deployed from a reel).

Accordingly, a pipeline consisting of several lined pipe sections can be constructed according to the electrofusion fitting methods of the invention herein described, and the integrity of the weld between fittings and linings checked in situ as part of the pipeline fabrication process. In fact, even using reel-lay or tow-in pipeline installation methods, subsequent lengths of lined pipe (which may be one or several km long rather than, say, 12 m long as used in length-by-length on-deck fabrication methods) can be joined and the joint integrity tested—and of course the continuous pipe (deployed from reel or by tow-in) might itself consist of several lined pipe sections so joined and tested onshore.

Very fast modern pipeline welding makes use of a closed bevel. However, to date it has not been possible to use a closed bevel approach in conjunction with electrofusion fittings. Electrical leads to electrofusion fittings have typically been passed through the gap between adjacent metal pipe length ends that are subsequently welded; the electrical leads remaining in the weld. This can be harmful to the integrity of the weld. The Applicant's earlier International Application Publication Number WO 2010/041016 sought to overcome this problem by providing electrical leads which extend through the fitting to an inner surface to allow the heating coils to be energised from within the pipeline bore and thus avoid weld contamination.

The Applicant has developed an alternative approach which permits laybarge productivity to be improved by allowing the use of a dosed bevel approach that does not require access to the pipeline bore to energise the heating coils. Furthermore (or alternatively) access to leak test or pressure test the weld can be achieved through a closed bevel.

Figure 10:
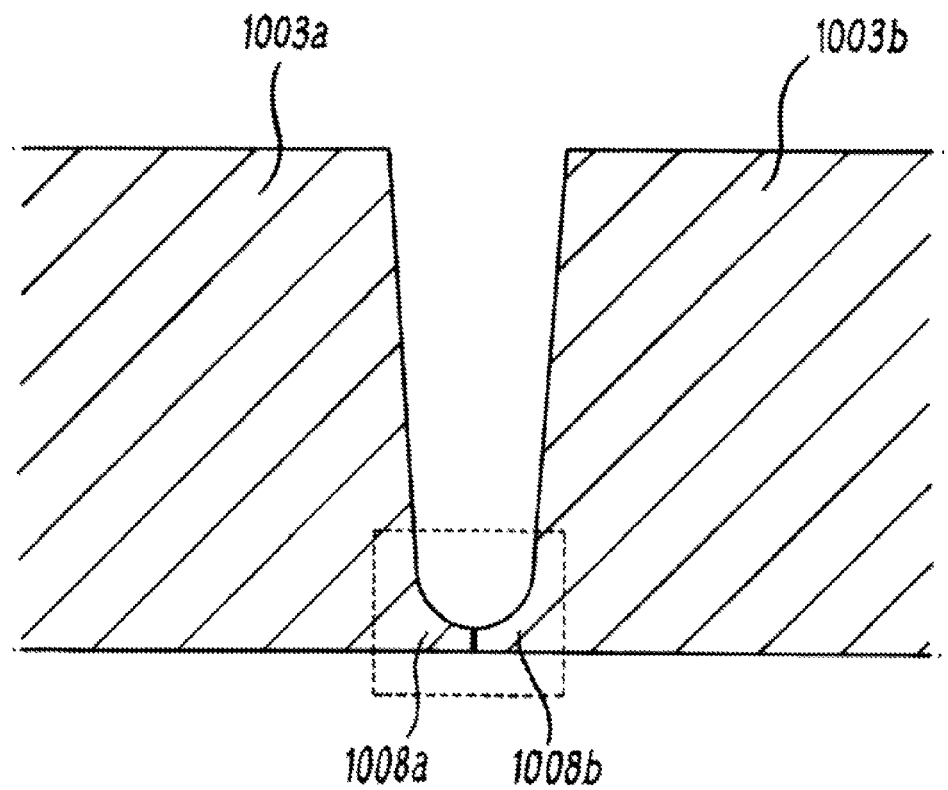
FIG. 10 is a schematic cross sectional view of adjacent pipe ends configured for automatic welding.

FIG. 10 shows adjacent ends of lined pipe sections 1003a, 1003b comprising J-bevels machined in preparation for automatic welding. The ends have been fitted up together such that the dosed bevel nibs 1008a, 1008b are in contact (so called "closed" fit up) to enable the welding of the root pass at the start of the girth weld, although it will be appreciated that a narrow gap might be provided there between (so-called "narrow gap" fit up).

Figure 11A:
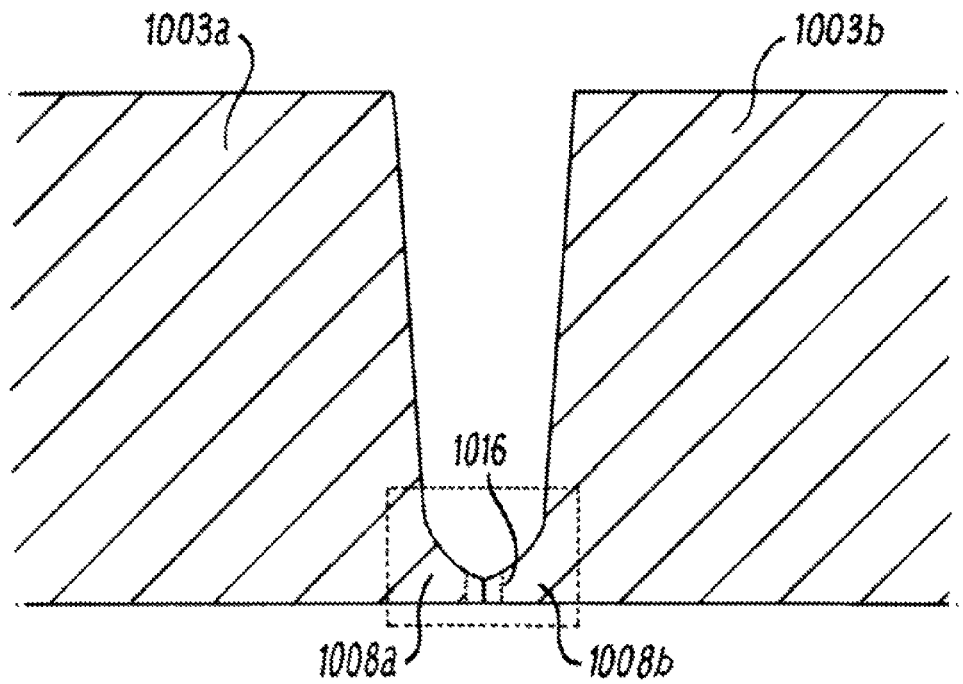
FIG. 11 is (a) a schematic cross sectional view, and (b) a plan view, of adjacent pipe ends configured for automatic welding, fitted up and drilled through according to an embodiment of the present invention.
Figure 11B:
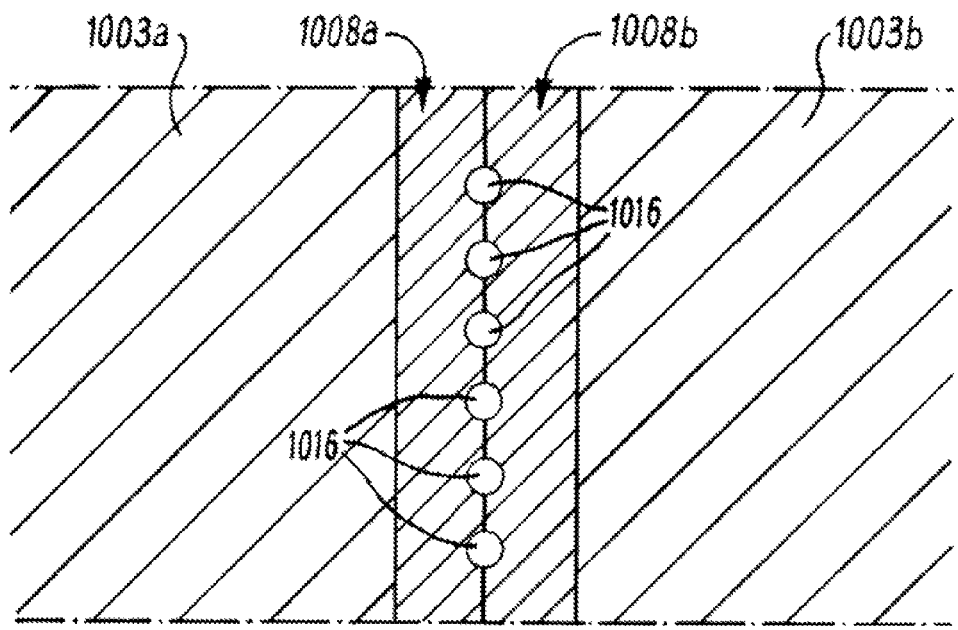

As shown in FIG. 11, one or more holes 1016 can then be drilled through the dosed bevel to provide access there through. The holes 1016 can be grouped or distributed around the circumference of the bevel, as illustrated in plan view in FIG. 11(b).

Figure 12:
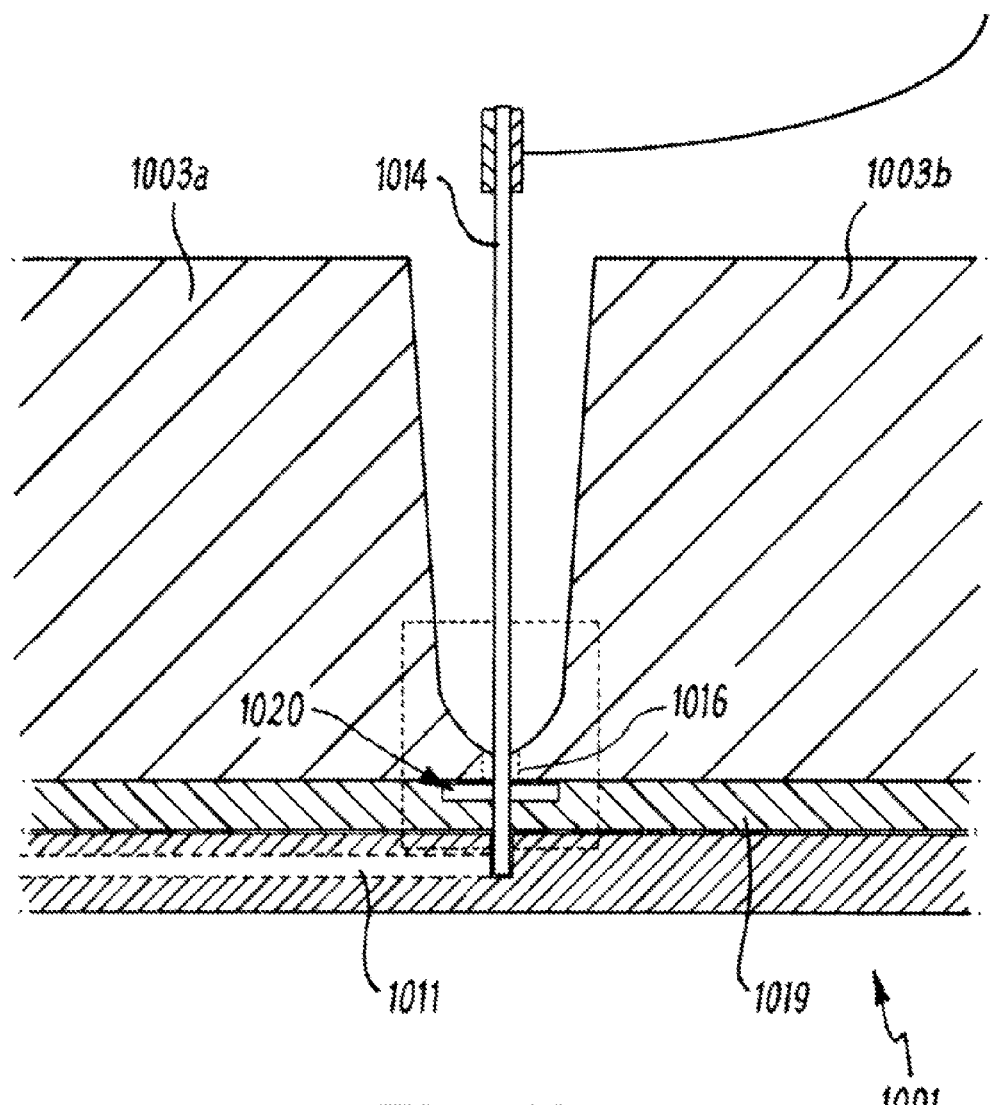
FIG. 12 is a schematic cross sectional view of adjacent pipe ends fitted up and drilled through as shown in FIG. 11, and a probe for the delivery of electricity and/or fluid to an electrofusion fitting through the dosed bevel, according to an embodiment of the present invention.

A portion of an electrofusion fitting 1001 in accordance with an aspect of the invention is shown in FIG. 12, extending between corresponding pipe linings (not shown) of pipe sections 1003a, 1003b. The hole 1016 drilled through the dosed bevel allows access through the closed bevel to channel 1011 which extends to a test region (not shown but as or similar to those described in previous embodiments). A probe 1014 can be inserted through the closed bevel and received in the channel 1011 to supply leak test or pressure test fluid to the test region.

An insulating layer is shown in recess 1019 of the electrofusion fitting 1001 which protects the electrofusion fitting 1001 from heat damage while the ends of pipe sections 1003a, 1003b are welded together. A further insulating ribbon 1020 is provided immediately below the dosed bevel to protect the insulating layer and the electrofusion fitting from welding arcs particularly during the root bead pass.

Once the integrity of the weld between the electrofusion fitting 1001 and one or both of the pipe linings has been tested, the probe 1014 can be withdrawn and the ends of pipe sections 1003a, 1003b welded together, beginning with the root bead pass. Molten metal created in the weld pool of the root pass melts the nibs 1008a, 1008b and as the molten metal cools and solidifies the hole (or holes) 1016 are filled with solid weld metal. Accordingly, a weld can be created between the ends of pipe sections 1003a, 1003b that is not compromised in the way that prior art welds have been compromised.

Although the probe 1014 is described as providing a means for supplying leak test or pressure test fluid to the test region through the dosed bevel, it will also be understood that a similar probe and a similar arrangement will provide a means for similarly, simultaneously or alternatively supplying electrical power to the heating coils of the electrofusion fitting through the dosed bevel—for example via a contact or contacts disposed on an outer surface of the electrofusion fitting (and in electrical communication with the heating coils) that receives the probe. Two sections of lined pipe can therefore be joined and/or the joint tested using a closed bevel approach, which allows high speed automatic pipeline welding techniques to be employed.

The final costs of a pipeline are dependent on the rate of laybarge progress, which in turn is dependent on welding production rates. The present invention also permits an increase in welding productivity with a corresponding reduction in the cost of producing a given length of pipeline.

The invention provides improvements to electrofusion fittings that enable the integrity of a weld between an electrofusion fitting and a pipe lining (or stand-alone pipe) to be tested in the field, and corresponding methods of installation and testing. An electrofusion fitting for joining sections of lined pipe has heating elements configured to create at least one weld between the electrofusion fitting and a pipe lining, and a channel provides fluid access to a test region between the electrofusion fitting and the pipe lining to allow leak testing to be performed. The channel may be provided through the fitting itself, or alternatively through the pipe lining. Methods of fabricating or laying pipeline may incorporate use of the improved fitting whether using length-by-length construction methods or joining subsequent reel-laid or towed-in pipe lengths. A dosed bevel welding approach, permitting high speed automatic pipeline welding processes to be employed, is described in which the closed bevel is drilled through to allow access there through for providing leak testing and/or electrical power to the heating elements.

Throughout the specification, unless the context demands otherwise, the terms 'comprise' or 'include', or variations such as 'comprises' or 'comprising', 'includes' or 'including' will be understood to imply the inclusion of a stated integer or group of integers, but not the exclusion of any other integer or group of integers.

The foregoing description of the invention has been presented for the purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims.

The invention claimed is:

1. An electrofusion fitting for joining sections of lined pipe, the electrofusion fitting comprising one or more heating elements disposed on a surface of the electrofusion fitting and configured to create, in use, at least one weld between the electrofusion fitting and a pipe lining, and a channel extending at least partially through the electrofusion fitting to provide fluid access to a test region between the electrofusion fitting and the pipe lining to leak test the at least one weld, wherein the channel extends between an aperture in a surface of the electrofusion fitting and the test region, and wherein the aperture is longitudinally spaced from the test region and the channel extends substantially longitudinally through the electrofusion fitting.

2. The electrofusion fitting according to claim 1, wherein the one or more heating elements are configured to produce one or more circumferential or annular welds between the electrofusion fitting and the pipe lining.

3. The electrofusion fitting according to claim 1, wherein the test region is disposed between two circumferential or annular welds.

4. The electrofusion fitting according to claim 1, wherein the test region is a substantially annular space between the electrofusion fitting and the pipe lining.

5. The electrofusion fitting according to claim 1, wherein the aperture is formed on an outer surface of the electrofusion fitting.

6. The electrofusion fitting according to claim 5, wherein the aperture is located so as to be proximal the end of a pipe into which the electrofusion is configured for insertion.

7. The electrofusion fitting according to claim 1, wherein the aperture is configured to receive a conduit for the supply of leak test or pressure test fluid.

8. The electrofusion fitting according to claim 1, wherein the aperture is configured to receive a probe via a hole drilled through a closed bevel between the lined pipe sections.

9. The electrofusion fitting according to claim 1, wherein the aperture is configured to receive a sealing plug.

10. The electrofusion fitting according to claim 9, wherein the aperture is located within a recess sized to receive the sealing plug.

11. The electrofusion fitting according to claim 9, wherein the aperture and/or channel can be filled with a filler material.

12. The electrofusion fitting according to claim 1, wherein the electrofusion fitting further comprises one or more electrical contacts disposed on an inner surface of the electrofusion fitting and connected to the one or more heating elements through the electrofusion fitting.

13. The electrofusion fitting according to claim 1, wherein the electrofusion fitting further comprises one or more electrical contacts disposed on an outer surface of the electrofusion fitting and connected to the one or more heating elements, the one or more electrical contacts configured to receive a probe for the supply of electrical power to the heating elements via one or more holes drilled through a closed bevel between the lined pipe sections.

14. The electrofusion fitting according to claim 1, wherein the channel is at least partially drilled through the electrofusion fitting.

15. The electrofusion fitting according to claim 1, wherein a suitable tube or pipe is inserted into the electrofusion fitting during manufacture by a casting or injection moulding process.

16. The electrofusion fitting according to claim 1, wherein the one or more heating elements comprises at least one pair of heating coils disposed towards an end of the electrofusion fitting.

17. The electrofusion fitting according to claim 1, wherein the electrofusion fitting comprises at least two pairs of heating coils disposed at either end of the electrofusion fitting defining at least one test region at each end of the electrofusion fitting.

18. The electrofusion fitting according to claim 17, wherein the electrofusion fitting comprises at least two channels extending through the electrofusion fitting to provide fluid access to corresponding at least two test regions.

19. The electrofusion fitting according to claim 18, wherein both of two channels extending through the electrofusion fitting extend substantially longitudinally through the electrofusion fitting.

20. The electrofusion fitting according to claim 18, wherein one of the channels extends substantially radially through the electrofusion fitting.

21. The electrofusion fitting according to claim 17, wherein the at least one pair of heating coils comprises two longitudinally separated but electrically connected portions of a continuous coil.

22. The electrofusion fitting according to claim 17, wherein the at least one pair of heating coils comprises two electrically separate heating coils.

23. The electrofusion fitting according to claim 1, wherein the electrofusion fitting comprises a thermoplastic material.

24. The electrofusion fitting according to claim 1, wherein the electrofusion fitting comprises a cylindrical sleeve of thermoplastic material.

25. The electrofusion fitting according to claim 1, wherein the electrofusion fitting is configured for insertion into the end of a lined pipe section.

26. The electrofusion fitting according to claim 1, wherein the electrofusion fitting is configured to be received in a recess in the end of the pipe lining.

27. The electrofusion fitting according to claim 26, wherein the electrofusion fitting is configured to be received in a recess formed in an inner surface of the pipe lining.

28. The electrofusion fitting according to claim 27, wherein the heating elements are arranged on an outer surface of the electrofusion fitting.

29. The electrofusion fitting according to claim 26, wherein the electrofusion fitting is configured to be received in a recess formed in an outer surface of the pipe lining.

30. The electrofusion fitting according to claim 29, wherein the heating elements are arranged on an inner surface of the electrofusion fitting.

31. The electrofusion fitting according to claim 26, wherein the electrofusion fitting is configured to abut the end of the pipe lining.

32. The electrofusion fitting according to claim 31, wherein the heating elements are arranged on an abutting end of the electrofusion fitting.

33. The electrofusion fitting according to claim 1, wherein the electrofusion fitting is formed by an injection moulding process.

34. A method of testing a weld between an electrofusion fitting and a pipe lining, comprising creating at least one weld between the electrofusion fitting and the pipe lining, and providing fluid through a channel in the electrofusion fitting to a test region between the electrofusion fitting and the pipe lining to leak test the at least one weld, wherein the channel extends between an aperture in a surface of the electrofusion fitting and the test region, and wherein the aperture is longitudinally spaced from the test region and the channel extends substantially longitudinally through the electrofusion fitting.

35. The method according to claim 34, comprising creating two annular welds between the electrofusion fitting and the pipe lining, and wherein the test region is bounded by the annular welds.

36. The method according to claim 34, comprising creating a recess in the pipe lining to receive the electrofusion fitting.

37. The method according to claim 34, comprising cooling the electrofusion fitting and the pipe lining after creating the at least one weld and prior to leak testing the at least one weld.

38. The method according to claim 34, comprising drilling one or more holes in a closed bevel formed between corresponding lined pipe sections.

39. The method according to claim 38, comprising providing fluid to the test region via the one or more holes.

40. The method according to claim 38, comprising providing electrical power to one or more heating coils of the electrofusion fitting via the one or more holes to create the at least one weld.

41. The method according to claim 40, comprising creating two annular welds between the electrofusion fitting and the pipe lining, and providing fluid to the test region bounded by the annular welds.

42. The method according to claim 40, comprising creating a recess in the pipe lining to receive the electrofusion fitting.

43. The method according to claim 40, comprising cooling the electrofusion fitting and the pipe lining after creating the at least one weld and prior to leak testing the at least one weld.

44. The method according to claim 40, comprising drilling one or more holes in a closed bevel formed between corresponding lined pipe sections.

45. The method according to claim 44, comprising providing fluid to the test region via the one or more holes.

46. The method according to claim 44, comprising providing electrical power to one or more heating coils of the electrofusion fitting via the one or more holes to create the at least one weld.

* * * * *